Aug. 5, 1958 E. A. SCHROETER 2,846,168
PIPE TRESTLE
Filed Aug. 8, 1956
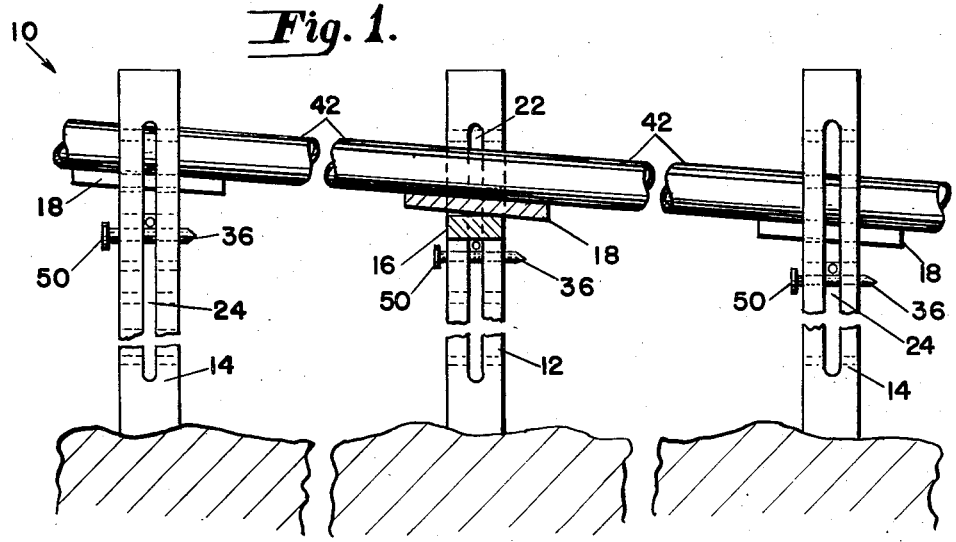
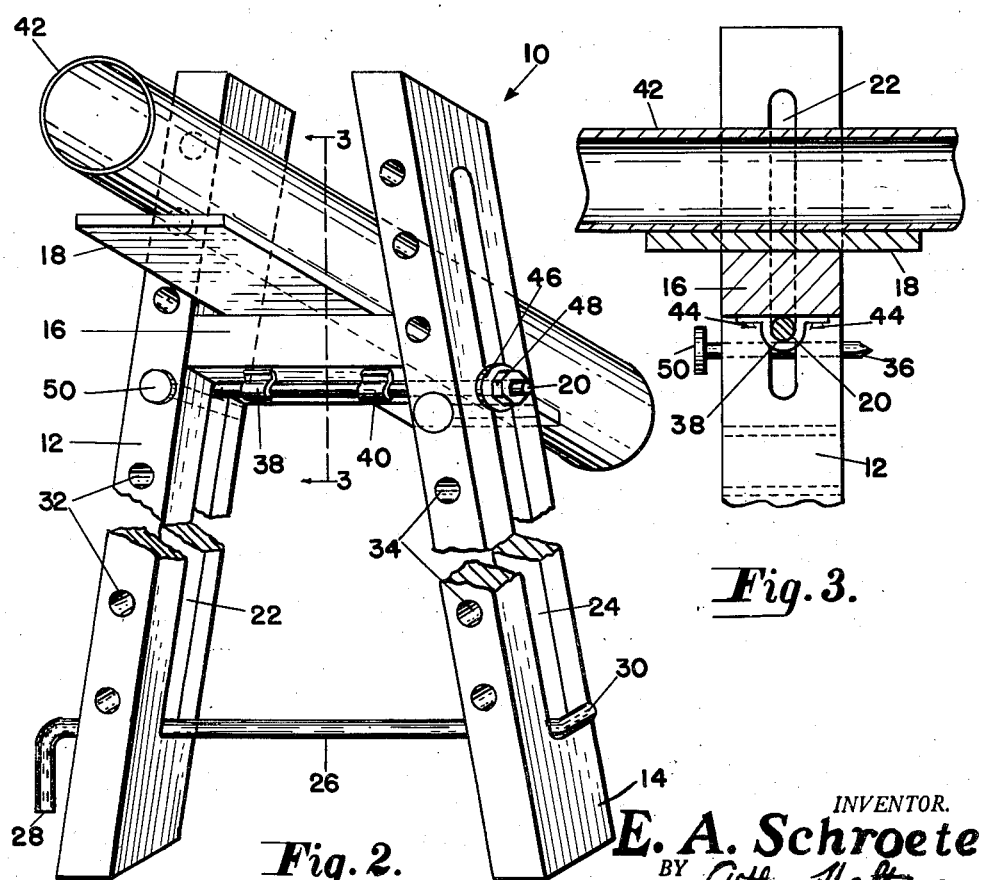
INVENTOR.
E. A. Schroeter
BY Arthur H. Sturges,
Attorney

United States Patent Office 2,846,168
Patented Aug. 5, 1958

2,846,168

PIPE TRESTLE

Edwin A. Schroeter, Schuyler, Nebr.

Application August 8, 1956, Serial No. 602,699

3 Claims. (Cl. 248—49)

This invention relates to irrigation particularly of farm lands where water is carried through pipes from one field to another and across arid lands, and in particular an adjustable trestle having a pipe carrying platform positioned between inclined legs and pivotally mounted in vertically disposed slots in the legs whereby with the trestle vertically positioned a pipe supported on the platform may be adjusted to different angles to correspond with the land being irrigated.

The purpose of this invention is to provide means for supporting irrigation pipe so that the supporting elements may readily be set up and adjusted in the field.

Numerous irrigation pipes carry water across fields and irregular terrain and where the pipes extend across valleys or gullies they are propped up with temporary supporting elements which, owing to the force of the water rushing through the pipes requires constant attention. Furthermore, and owning particularly to the soft ground, it is difficult to maintain such pipes with the sections thereof in straight lines so that pockets develop continuously.

With this thought in mind this invention contemplates a trestle adapted to be positioned at regular intervals along a pipe line and in which a pipe retaining platform is pivotally mounted in vertically disposed slots in the upper ends of legs positioned in the form of an A-frame whereby the trestle may be positioned at desired points along a pipe line and the elevations of the platforms adjusted to correspond with the positions of the pipe sections.

The object of this invention is, therefore, to provide a flexible pipe supporting trestle that is adapted to be set up upon uneven ground and in which pipe and the like may be supported at different elevations.

Another object of the invention is to provide a trestle for supporting pipe of irrigation lines in which the trestle is collapsible so that it may readily be taken apart and stored in a comparatively small area.

Another important object of the invention is to provide a collapsible trestle by which irrigation pipe lines may be supported above the ground.

A further object of the invention is to provide a pipe carrying trestle for irrigation lines in which a platform upon which pipe is positioned is pivotally supported so that the pipe may rock or swing to compensate for the soil washing away or settling.

A still further object of the invention is to provide an adjustable pipe line supporting trestle which is of a simple and economical construction.

With these and other objects and advantages in view the invention embodies a pair of upwardly disposed converging legs with elongated slots in the upper ends and having rows of spaced openings extended through the portions of the legs at the sides of the slots, pins extended through the openings and slots, a cradle positioned between the legs, a bolt extended through the slots and upon which the cradle is rotatably mounted, a platform position on the cradle, and a bar having the ends bent at right angles positioned with the ends in the lower ends of the slots for retaining the legs in spaced relation.

Other features and advantages of the invention will appear from the following description taken in connection with the drawings, wherein;

Figure 1 is an elevational view showing sections of a pipe line supported by trestles with parts broken away and with one of the trestles shown in section.

Figure 2 is a perspective view showing a pipe supported by a trestle with parts broken away and with the parts shown on an enlarged scale.

Figure 3 is a cross section through the trestle taken on line 3—3 of Figure 2, with parts broken away.

While one embodiment of the invention is illustrated in the above-referred-to drawings, it is to be understood that they are merely for the purpose of illustration, and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 legs of the trestle, numeral 16 a block having beveled ends positioned between the legs and upon which a block forming a platform 18 is mounted, the block and board forming a cradle, numeral 20 a bolt, the ends of which extend through slots 22 and 24 in the legs, and numeral 26 a rod, the ends 28 and 30 of which are extended at right angles, to provide supporting means for the legs.

The legs 12 and 14 are provided with vertically spaced transversely disposed openings 32 and 34, respectively, and the ends of the bolt 20 are retained in adjusted positions in the slots 22 and 24 with pins 36 which are positioned in the openings 32 and 34. The bolt extends through bearings 38 and 40 on the under surface of the block 16 whereby a pipe 42 positioned on the platform 18 is free to swing or pivot on each trestle.

The bearings are secured to the block of the cradle by bolts 44, and the ends of the bolt 20 are provided with washers 46 and nuts 48. The pins 36 are provided with heads 50 to facilitate removing the pins to adjust the position of the cradle, platform, and pipe. The cradle is formed with the block 16 which is supported by the rod 20, and the board 18 is positioned on the block. The board or platform 18 may be freely positioned on the block, or may be secured to the block by an adhesive, or other suitable fastening means.

Operation

With the parts designed and assembled as illustrated and described the legs 12 and 14 are placed in upright positions and the cradle and platform are assembled upon the bolt 20 with the ends of the bolt extended through the slots and resting upon the pins 36. The ends of the rod 26 are inserted through the slots 22 and 24 and turned to the positions shown in Figure 2, whereby the ends prevent the lower ends of the legs spreading.

The elevation of the legs and platform suspended therein is dependent upon the surface of the ground and, particularly in carrying a pipe on a hillside the platform may be in the lower end of one trestle and in the upper end of the adjoining trestle, whereby the elevation of the pipe may be substantially level, or on a slight incline continuously.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention, that which is claimed to be new and desired to be procured by Letters Patent, is:

1. A pipe carrying trestle comprising upwardly disposed legs, said legs having longitudinally disposed slots extended substantially throughout the length thereof therein and transversely positioned openings at the sides of the slots, a bolt positioned with the ends extended through the slots of the legs, pins positioned in the openings for supporting ends of the bolt, and a cradle pivotally mounted on the bolt.

2. In an irrigation pipe trestle, the combination which comprises spaced inclined upwardly converging legs, said legs having elongated longitudinally positioned slots therein and transversely disposed openings in the edges at the sides of the slots, pins extended through said openings, a bolt positioned with the ends extended through the slots and resting upon said pins, a cradle pivotally mounted on the bolt, and a rod having angularly disposed ends positioned with the ends extended through the slots of the legs for limiting spreading movements of the legs.

3. In an A-shaped trestle for supporting irrigation pipe, the combination which comprises spaced inclined upwardly disposed converging legs, said legs having elongated longitudinally disposed slots therein and transversely positioned openings therethrough, pins extended through the transversely positioned openings of the legs and extended through said slots therein, a bolt having nuts and washers on the ends positioned with the ends extended through the slots of the legs, a cradle positioned between the legs, bearings secured to the under surface of the cradle and through which the bolt extends, and a rod having angularly disposed ends positioned in the lower ends of the slots with the ends extended through the slots for limiting spreading movements of the legs.

References Cited in the file of this patent

UNITED STATES PATENTS

| | | |
|---|---|---|
| 675,106 | Oberle | May 28, 1901 |
| 1,129,410 | Macklem | Feb. 23, 1915 |
| 1,682,671 | Gooding | Aug. 28, 1928 |